(12) United States Patent
Dasilva et al.

(10) Patent No.: US 9,465,871 B1
(45) Date of Patent: Oct. 11, 2016

(54) EXTERNAL VERIFICATION OF CONTENT POPULARITY

(71) Applicant: Google Inc., Mountain View, CA (US)

(72) Inventors: Tim Dasilva, North Hills, CA (US);
Philo Juang, Paris (FR); Palash Nandy, San Francisco, CA (US);
Murali Krishna Visawanathan, Mountain View, CA (US); Stanley Charles Ross Wolf, Paris (FR)

(73) Assignee: GOOGLE INC., Mountain View, CA (US)

( * ) Notice: Subject to any disclaimer, the term of this patent is extended or adjusted under 35 U.S.C. 154(b) by 199 days.

(21) Appl. No.: 13/961,749

(22) Filed: Aug. 7, 2013

(51) Int. Cl.
*G06F 17/30* (2006.01)

(52) U.S. Cl.
CPC ............................. *G06F 17/30861* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,633,874 | B1* | 10/2003 | Nusbickel | G06F 17/30902 |
| 2003/0229895 | A1* | 12/2003 | Jasinschi | H04N 5/445 725/46 |
| 2009/0006542 | A1* | 1/2009 | Feldman | G06F 17/30053 709/203 |
| 2010/0131455 | A1* | 5/2010 | Logan | G06F 17/30905 707/602 |
| 2011/0004693 | A1* | 1/2011 | Rehfuss | G06Q 50/01 709/229 |
| 2012/0046960 | A1* | 2/2012 | Salta | G06Q 50/01 705/1.1 |

* cited by examiner

*Primary Examiner* — Etienne Leroux
(74) *Attorney, Agent, or Firm* — Lowenstein Sandler LLP

(57) ABSTRACT

A system and method for externally verifying content popularity served via a content sharing service, including an access analyzer to create a list based on a number of accesses associated with content items served via the content sharing service, an external source interface module to monitor external sources for content items being served via the external sources, a list verifier to determine if the content items from the list match any of the content items from the external sources, and a list generator to create an externally verified list based on the determination from the list verifier.

18 Claims, 4 Drawing Sheets

EXTERNAL VERIFICATION OF CONTENT POPULARITY

BACKGROUND

Content sharing services serve content, such as pictures, videos, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and subsequently retrieve the content prior to serving the content to the visitors.

The visitor may employ various techniques to access the content. For example, the visitor may access the content sharing service through a browser. In another example, the visitor may access the content sharing service via an application installed on a mobile device. The visitor may use any sort of device enabled to interact with the content sharing service, such as a personal computer, mobile phone, or an Internet enabled television, for example.

The content sharing service may rank the content based on various heuristics. For example, the content sharing service may employ a ranking based on a count associated with the accessing of a specific content item. The content sharing service may relate the count with the popularity of a specific content item. Thus, a content item that has been accessed one million times may be deemed more popular than a content item that has been accessed one thousand times.

The content sharing service may serve a list of the most popular content items based on the above-described ranking. The list may strategically be embedded with content already being served by the content sharing service.

For example, the list may be presented to a visitor to the content sharing service in response to the visitor indicating a desire to terminate access to the content sharing service (log-off). Due to the fact that the list contains content items that have proven to be successful at captivating other users' interests, the list may be successful at convincing the user to not log-off the content sharing service. In another example, the list may be presented in response to any sort of Information identifying the visitor not being available, such as a start page to the content sharing service.

Generally, the list serves to incentivize the content sharing service's user base to maintain access to the content sharing service. By retaining users to view additional content, the content sharing service may monetize the serving of shared content to the users.

The shared content may be served before, during and after the presentation of the content. The shared content may be associated with meta information, and when the shared content is clicked-through by a user, the user may be redirected to additional content associated with the shared content. The shared content may provide Information associated with a product or service related to the content.

SUMMARY

A system and method for externally verifying content popularity served via a content sharing service, including an access analyzer to create a list based on a number of accesses associated with content items served via the content sharing service, an external source interface module to monitor external sources for content items being served via the external sources, a list verifier to determine if the content items from the list match any of the content items from the external sources, and a list generator to create an externally verified list based on the determination from the list verifier.

DESCRIPTION OF THE DRAWINGS

The detailed description refers to the following drawings, in which like numerals refer to like items, and in which.

DETAILED DESCRIPTION

Figure 1:
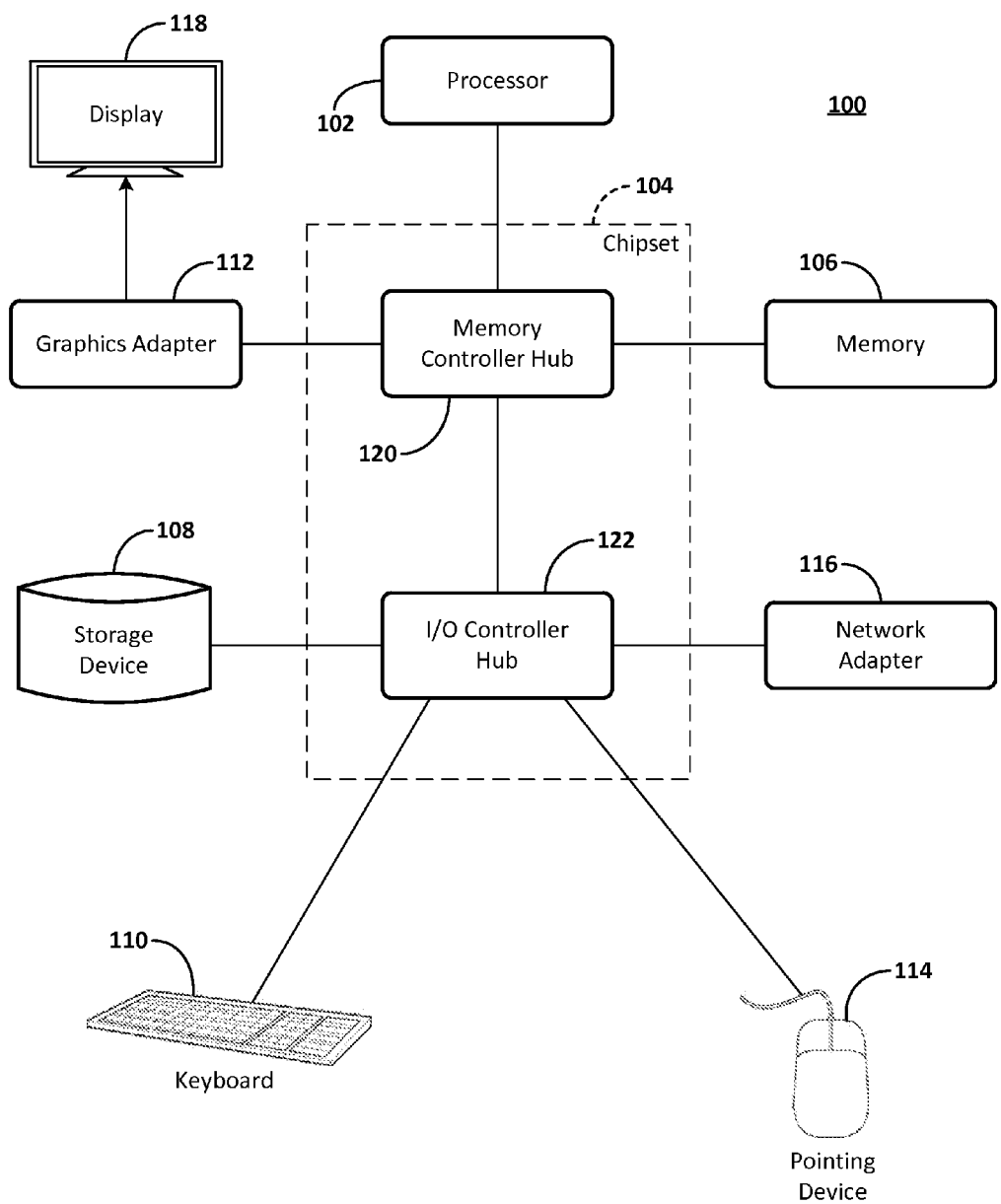
FIG. 1 is a block diagram illustrating an example computer.

A content sharing service may automatically generate lists of content to serve to visitors of the content sharing service. The lists may pertain to interests or categories that may serve to incentivize the visitors to remain on the content sharing service.

Often times, the list represents the most popular content items served on the content sharing service. For example, the content sharing service may record a number of accesses to each content item, respectively. The content sharing service may rank the content items based on the number of accesses to each content item. The list may reflect this ranking, and sort the presentation of the content items in a ranking from the most accessed content item at the highest position. The list may be capped, thereby showing a predefined amount of the most accessed content items.

By employing a technique of ranking based on the number of accesses to create the list, the content sharing service may effectively not serve the visitors content items with the most widespread appeal. Several factors may lead to the content not being of interest to a general audience.

Some content items may be accessed quite a bit, and thus, have a high access count, but not be of interest to the general audience. For example, the content sharing service may host a video directed towards teaching a viewer how to tie a tie. A small percentage of the visitor base of the content sharing service may be Interested in learning to tie to a tie. And thus, the small percentage may access this video quite a few times.

However, the video directed towards teaching a viewer how to tie a tie may not be of interest to the average visitor. Thus, including this video in the automatically created list frustrates one of the goals of the list, to incentivize visitors to not terminate access to the content sharing service.

In another example, certain popular content may be in a language or geographical area that is isolated. Thus, a large segment of visitors who speak one language or are located in one area may be Interested in specific content. However, this specific content item may not be of general interest to most of the visitors to the content sharing service.

In another example, a source of a content item may pay a third-party service to falsely access the content item. The third-party service may employ software to artificially inflate the view count associated with the content item. The source of the content item may employ the third-party to perform this task for various reasons, such as inflating the revenue associated with the content item being viewed, as well as ensuring the placement of the content item onto the above-described list.

Based on the cases mentioned above, certain content items appear on automatically generated lists of the content sharing services most popular content items. However, the content items may not be of general interest to the visitor base as a whole, or falsely be placed on the list through the use of artificial techniques. The list may not interest the average visitor of the content sharing service, and thus, the content sharing services goal of retaining a visitor is frustrated.

Disclosed herein are methods and systems directed to verifying the popularity of a content item via an external source. The methods and systems disclosed herein cross-reference data from a content sharing service with external data, such as data sourced from other popular sources, such as blogs, news sites, social networking sites, for example. By cross-referencing data with external sources, the content sharing service ensures that the content item on an automatically generated list is of Interest to a general audience, and not just popular based on phenomena that may inflate the content item's number of accesses.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally Identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
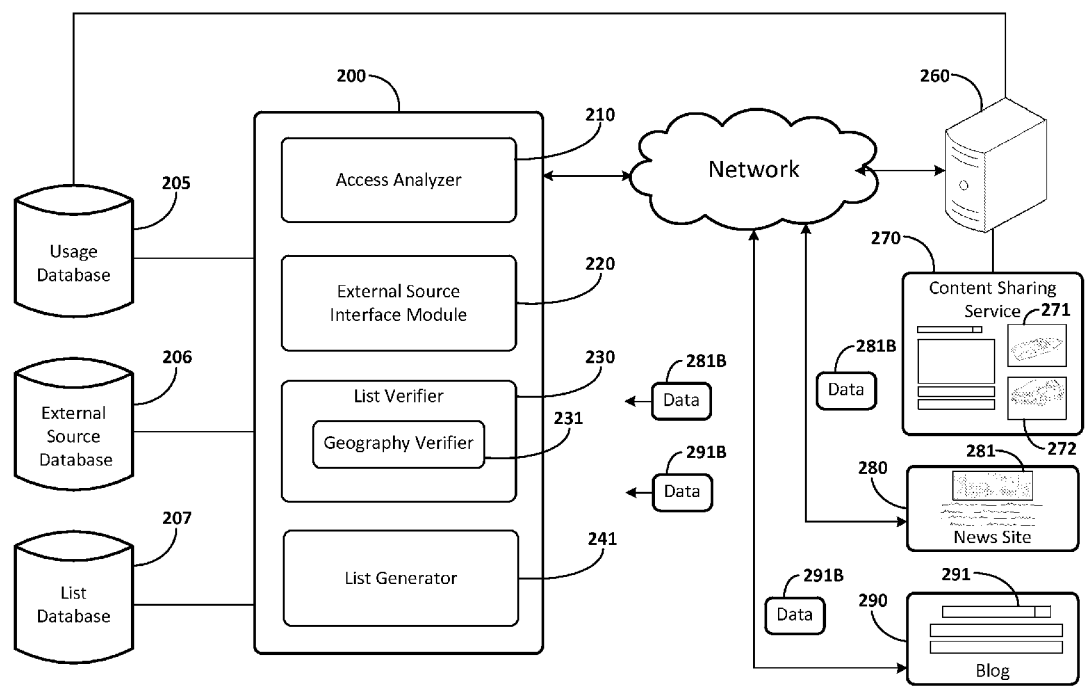
FIG. 2 illustrates an example of a system for externally verifying content popularity.

FIG. 2 illustrates an example of system for an external verification of content on a content sharing service 270. The system 200 includes an access analyzer 210, an external source interface module 220, a list verifier 230, and a list generator 240. As Illustrated in FIG. 2, the system 200 communicates via network 250 to a server 260. The server 260 hosts a content sharing service 270. The server 260 and system 200 may be implemented on a device, such as computer 100.

The content sharing service 270 serves content to devices that access the content sharing service 270 over the network 250. The content sharing service 270 maintains a count of all the accesses of each content item that the content sharing service 270 serves. Content may refer to videos, audio, multimedia embedded with meta information, text, or any combination thereof. The content may be sourced from visitors to the content sharing service, third-party publishers, or an operator of the content sharing service 270. The content may be Indexed via keywords and other identifying information. Thus, the content may be retrieved by the visitor entering in a keyword search, or being provided indexed categories to search through, for example.

Alternatively, the content may be automatically served to the visitor based on prior interest or preferences Indicated by the visitor. Often times, the content sharing service 270 is not cognizant of the visitor's prior activities, and thus, the content sharing service 270 may provide the visitor with popular content items.

The content sharing service 270, a news site 280, and a blog 290 serve content to various visitors. Visitors may access all three services via network 250, and consume the content being served, such as content item 271, content item 272, content item 281, and content item 291. In certain cases, the three services listed above may serve overlapping content. Thus, content item 271 and content item 291 may refer to the same content item.

The access analyzer 210 monitors a usage database 205. The usage database 205 maintains a recordation of all accesses to the content sharing service 270. Thus, the usage database 205 may record individual count totals per content item served by the content sharing service 270. The usage database 205 may be implemented as part of server 260, or alternatively, be any sort of data storage, such as those enumerated above with regards to data store 108.

The access analyzer 210 may generate a preliminary list that indicates the most popular content items based on access count. The Implementation of system 200 may limit the amount of content items based on a predefined limit. For example, if the predefined limit is ten, the list generated may contain the ten most accessed content items on the content sharing source 270.

The external source Interface module 220 interfaces with external sources registered in the external source database 206. An implementer of system 200 may manually register a predetermined number of external sources to monitor. For example, the implementer of system 200 may record a hundred popular web sites that source trending videos or content.

Alternatively, system 200 may implement an automated technique to populate the external source database 206 with external sources to be monitored. For example, system 200 may record the external sources with a large number of referrals to the content sharing source 270. In another example, the content sharing source 270 may record the external sources with the highest amount of visitors.

For example, external source database 206 may include news site 280 and blog 290 as registered external sources to be monitored. Thus, periodically, the external source Interface module 220 may monitor news site 280 and blog 290 for content items being served. For example, the external source interface 220 may record that the content item 281 and content item 291 are presently being served. As shown in FIG. 2, data 2818 and data 291B indicate a recordation of the content being served by news site 280 and blog 290. This information may be stored in the external source database 206.

The list verifier 230 verifies the list generated by the access analyzer 210, based on the Information recorded by the external source Interface module 220. In particular, the list verifier 230 determines if an Item on the list is also found posted on various external sources, such as news site 280 or blog 290.

For example, the list may contain content items 271 and 272, which are shown as served on content sharing service 270. Content item 271 may be the same content item as content item 281 and content item 291. The list verifier 230 retrieves the data of the recordation of the items being served from the monitored external sources, and records if content item 271 is cross-referenced on an external source, and if so, how many times the content item is referenced.

In the above example, content item 272 may not be cross-referenced on any external sources. Thus, the list verifier 230 may Indicate this as well.

The list verifier 230 also includes a geography verifier 231. The geography verifier 231 may further determine that the content item is cross-referenced based on a geographical limitation. Thus, if content item 271 is listed as one of the most accessed content items, the geographical verifier 231 may perform external verification based on the geographical locale of where the list will be served. For example, if the list is to be served in France, the geographical verifier 231 may verify the list specifically with content served via external sources located in France.

The list generator 240 may regenerate the list based on the information ascertained by the list verifier 230. For example, the list generator 240 may determine different weightings for the following categories to create a new metric for determining which content items are served as a list indicating popular content items associated with a content sharing service.

For example, content item 271 may be accessed 50 times, while content item 272 may be accessed 40 times. The list generator 240 may be cognizant based on the verification performed by the list verifier 230, that content item 271 is cross-referenced on two external sources, while content item 272 is not cross-referenced on any external sources. The list generator 240 may regenerate the list based on placing a greater weighting attributed to being cross-referenced on registered external sources. The regenerated list may be stored in list database 207. The weighting associated with the number of accesses of a content item, the amount of external sources the content items is cross-referenced with, and the Information from the geographical verifier 231 may be predefined by an implementer of system 200.

Figure 3:
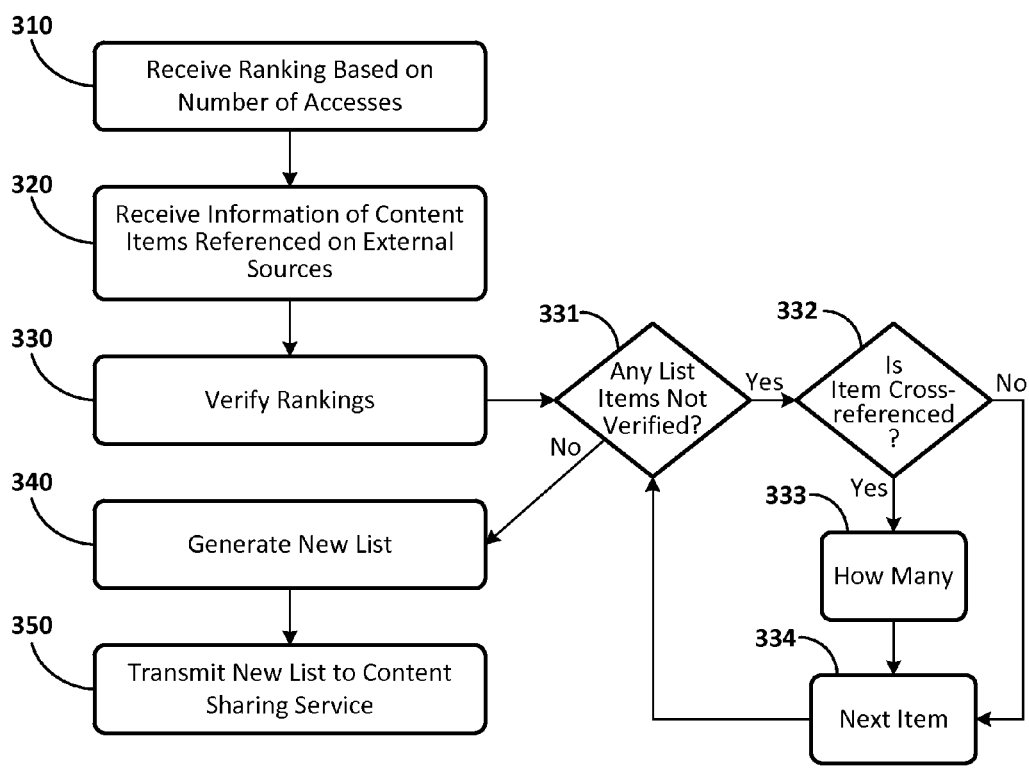
FIG. 3 illustrates an example of a method for externally verifying content popularity.

FIG. 3 an example of method 300 for externally verifying content items served by a content sharing service 270. The method 300 may be Implemented on a device, such as system 200.

In operation 310, a ranking of accessed content items may be received from a content sharing service 270. The number of content items ranked may be predetermined. For example, if the number is set to ten, the ten most accessed content items may be retrieved. The rankings reflect the number of times a visitor to the content sharing service 270 accesses a specific content item on the content sharing service 270. The rankings may be further demarcated over a specific time period (e.g. a week, a day, a month).

In operation 320, various external sources are Interfaced with. The external sources interfaced with may be registered in a way such as those described above in regards to element 220. The external sources may be any sort of popular content distribution service, such as a news site, blog, social networking site, for example. A recordation is made of content being served on the external sources.

The recordation may be further restricted based on a predetermined time/date limit. The implementer of method 300 may determine to interface with information from registered external sources based on a cutoff date (for example, content only served within the past two weeks).

In operation 330, the rankings received in operation 310 are verified against the information received in operation 320. In operation 330, the rankings generated in operation 310 may iteratively be verified.

In operation 331, a determination is made as to whether any of the content items on the rankings have not been verified. If no, the method 300 proceeds to operation 340. If yes, the method 300 proceeds to operation 332.

In operation 332, a determination is made as to whether the content item is referenced in one of the registered external sources. As explained above, information of all the content items referenced in registered external sources is generated in operation 320. If the content item is not cross-referenced, the method 300 proceeds to operation 334. If the content item is cross-referenced, the method 300 proceeds to operation 333.

In operation 333, a determination is made as to how many times the content item is referenced on the registered external sources. The count of the number of cross-references per content item being verified is stored, and the method 300 proceeds to operation 334.

In operation 334, if there are content items that have not been verified, method 300 increments to the next content item on the list generated in operation 310. After operation 334, method 300 proceeds to operation 331.

In operation 340, a new list may be created using the verified information generated in operations 331-334. Each item on the list may be assigned a score based on the following parameters: number of accesses, number of cross-references, and a geographical similarity between the visitor being served the list and the cross-references (see geographical verifier 231). Depending on the implementation of method 300, the above three categories may be weighted differently based on an implementer of method 300's preference.

In operation 350, the new list is transmitted to a content sharing service. The new list of popular content items (and the corresponding order based on popularity) may be displayed throughout various points of content sharing service 270.

Figure 4A:
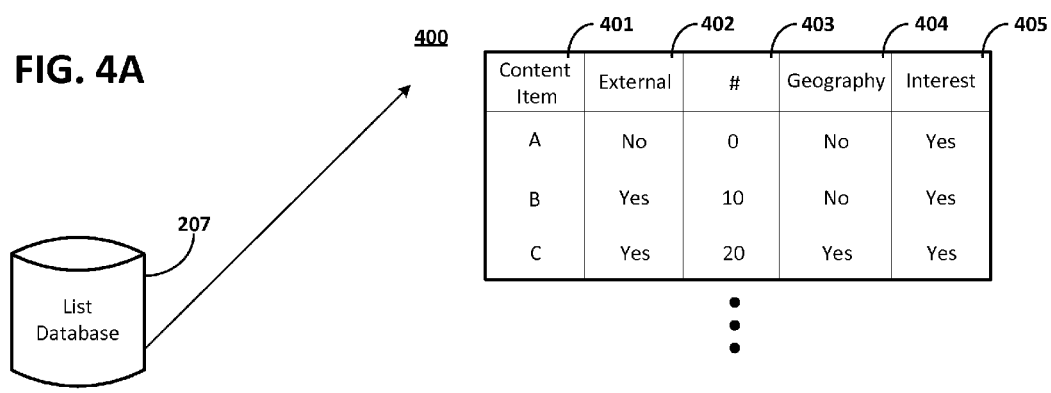
FIGS. 4(a)-(b) illustrate an example of list database 207 according to system 200.
Figure 4B:
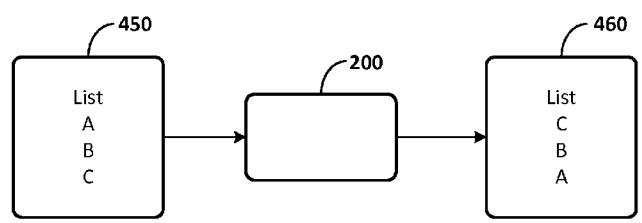

FIGS. 4(a)-(b) illustrate an example implementation of list database 207 according to system 200. Referring to FIG. 4(a), a lookup table 400 is stored in the list database 207.

The lookup table 400 is populated with a list of the most accessed content items served via content sharing service 270. The lookup table 400 may be ordered from the most accessed to the least accessed on the content sharing service 270.

The lookup table 400 has the following fields: content item 401, external source 402, number of external sources 403, and geographically verified 404. Field 401 refers to each individual content item. Field 402 is a yes/no indication of whether the content item is found in any of the registered external sources stored in external source database 206. Field 403 refers to the count of registered external sources that each content item is found in. Field 404 is an Indication if the external sources are relevant to the geographical location of the visitor to the content sharing service 270.

Referring to FIG. 4(b), the listed items in lookup table 400 are ranked according to their access count number in list 450. Once the list is processed via system 200, a new list 460 is generated. Various combinations and weighting may be employed when implementing system 200. In list 460, a higher weight is given to field 403, and thus, content item C is displayed first. This is contrary to the list 450, which placed content items A and B over C, due to the fact that A and B were accessed more. By using the aspects and methods disclosed herein, a greater weight is attributed to the fact that content item C is contained in 20 registered external sources, and thus presumed to be more externally verified than content items A and B (which are contained in fewer registered external sources).

Thus, according to the aspects disclosed herein, a content sharing service may distribute and serve a list of popular content items by employing techniques that externally verify the popularity of a respective content item. By doing so, the list may truly reflect that the content item has appeal to a general audience. Further, by externally verifying the content items, the Integrity of a list of popular content items is protected.

Certain of the devices shown in FIG. 1 include a computing system. The computing system includes a processor (CPU) and a system bus that couples various system components Including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some Instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or Implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be Implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system comprising:
a memory; and
a processing device, coupled to the memory, to:
create, for a plurality of users of a content sharing service, a preliminary list of popular content items from content items served via the content sharing service, the preliminary list of popular content items is created based on a number of accesses associated with the content items served via the content sharing service; and
verify, for a subset of the plurality of users at a first geographic location, popularity of popular content items on the preliminary list using external content distribution sources that are external to the content sharing service, wherein to verify the popularity of the popular content items on the preliminary list, the processing device is to:
identify content items being served via the external content distribution sources;
determine if the popular content items from the preliminary list match any of the content items served via the external content distribution sources;
responsive to determining that a popular content item from the preliminary list has a matching content item served via one or more of the external content distribution sources, determining a number of external content distribution sources serving the matching content item, and relevance of the external content distribution sources serving the matching content item to the first geographic location; and
create an externally verified list for presentation to the subset of the plurality of users associated with the first geographic location via the content sharing service, wherein the externally verified list is created based on the number of external content distribution sources serving the matching content item, and the relevance of the external distribution sources serving the matching content item to the first geographic location.

2. The system according to claim 1, wherein the processing device is to record the number of external content distribution sources that serve content items matching popular content items from the list.

3. The system according to claim 2, wherein the processor is to employ predetermined weights of the number of accesses, and the number of external content distribution sources to generate the externally verified list.

4. The system according to claim 3, wherein the predetermined weighting is also based on a geographical location of a user to whom the content sharing service is to serve the externally verified list.

5. The system according to claim 4, wherein the externally verified list is dynamically updated at a predetermined time.

6. The system according to claim 1, wherein the external content distribution sources are manually registered.

7. The system according to claim 1, wherein the external content distribution sources are selected via an automatic technique.

8. The system according to claim 1, wherein the external content distribution sources are at least one of: blogs, news sites, social networking sites, or other content sharing services.

9. A method comprising:
ranking, for a plurality of users of a content sharing service, a preliminary list of content items served via the content sharing service based on a number of accesses for each respective content item; and
verifying, for a subset of the plurality of users at a first geographic location, popularity of the ranked content items on the preliminary list using external content distribution sources that are external to the content sharing service, wherein verifying the popularity of the ranked content items on the preliminary list comprises:
identifying content items being served by the external content distribution sources;
verifying for each of the ranked content items on the preliminary list if the each of the ranked content items matches any of the content items served by at least one of the external content distribution sources;
responsive to determining that a ranked content item from the preliminary list has a matching content item served via one or more of the external content distribution sources, determining a number of external content distribution sources serving the matching content item, and relevance of the external content distribution sources serving the matching content item to the first geographic location; and
generating, by a processing device, a new list of popular content items based on the number of external content distribution sources serving the matching content item, and the relevance of the external distribution sources serving the matching content item to the first geographic location, the new list of popular content items to be presented to the subset of the plurality of users of the content sharing service.

10. The method according to claim 9, wherein the generating further comprises employing predetermined weights of the number of accesses and the number of external content distribution sources to generate the new list.

11. The method according to claim 10, wherein the external content distribution sources are at least one of; blogs, news sites, social networking sites, or other content sharing services.

12. The method according to claim 9, wherein the external content distribution sources are manually registered.

13. The method according to claim 9, wherein the external content distribution sources are selected via an automatic technique.

14. The method according to claim 9, wherein the predetermined weighting is also based on a geographical location of a user to whom the content sharing service is to serve the new list.

15. The method according to claim 14, wherein the new list is dynamically updated at a predetermined time.

16. A non-transitory computer readable storage medium, having instructions stored therein, which when executed, cause a processing device to perform operations comprising:
  ranking, for a plurality of users of a content sharing service, a preliminary list of content items served via the content sharing service based on a number of accesses for each respective content item; and
  verifying popularity of the ranked content items using external content distribution sources that are external to the content sharing service, wherein verifying the popularity of the ranked content items on the preliminary list comprises:
    identifying content items being served by the external content distribution sources;
    verifying for each of the ranked content items on the preliminary list if the each of the ranked content items matches any of the content items served by at least one of the external content distribution sources;
    responsive to determining that a ranked content item from the preliminary list has a matching content item served via one or more of the external content distribution sources, determining a number of external content distribution sources serving the matching content item, and relevance of the external content distribution sources serving the matching content item to the first geographic location; and
    generating, a new list of popular content items based on the number of external content distribution sources serving the matching content item, and the relevance of the external distribution sources serving the matching content item to the first geographic location, the new list of popular content items to be presented to the subset of the plurality of users of the content sharing service.

17. The method according to claim 16, wherein the generating further comprises employing predetermined weights of the number of accesses and the number of external content distribution sources to generate the new list.

18. The method according to claim 16, wherein the predetermined weighting is also based on a geographical location of a user to whom the content sharing service is to serve the new list.

* * * * *